United States Patent Office 3,144,753
Patented Aug. 18, 1964

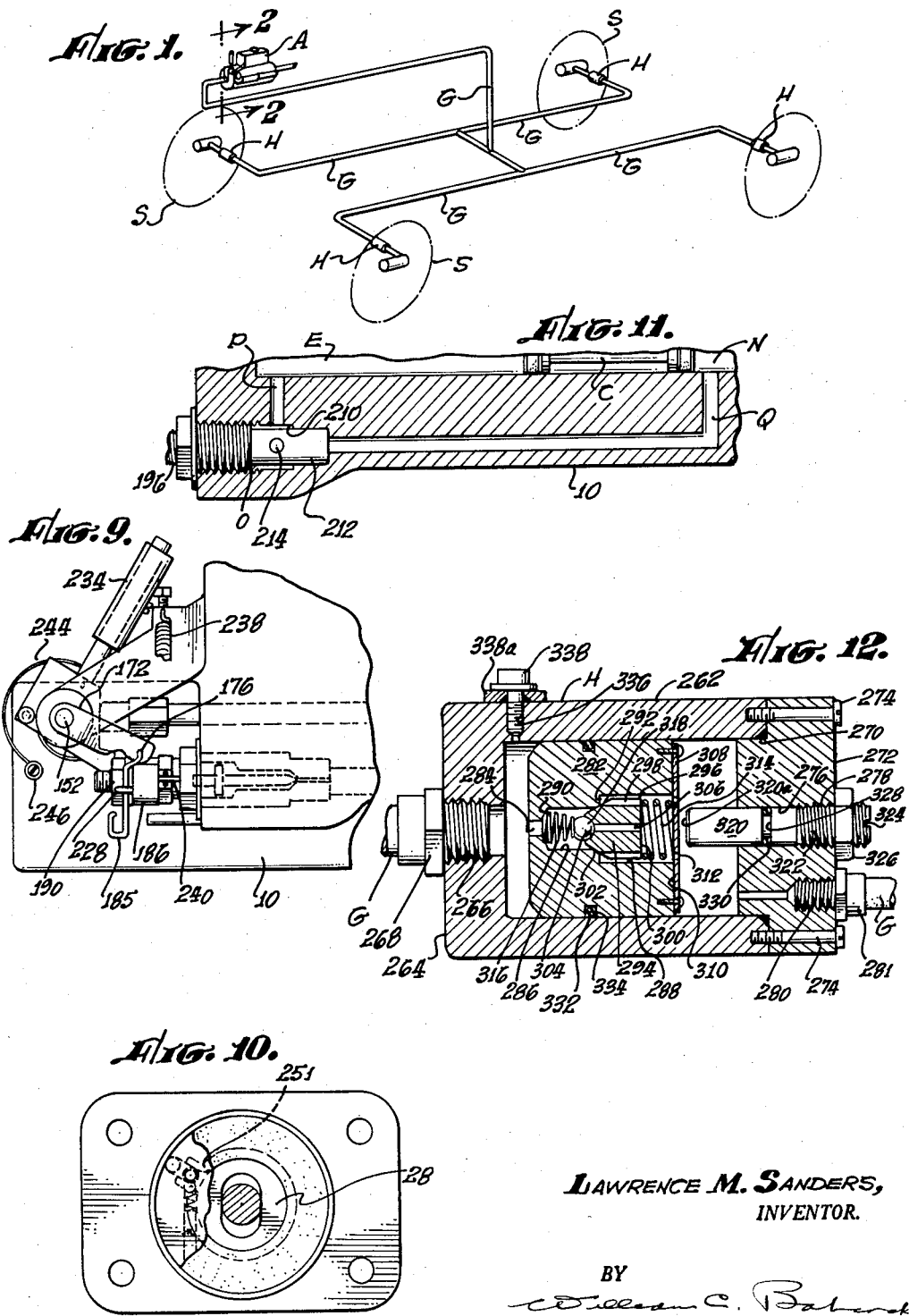

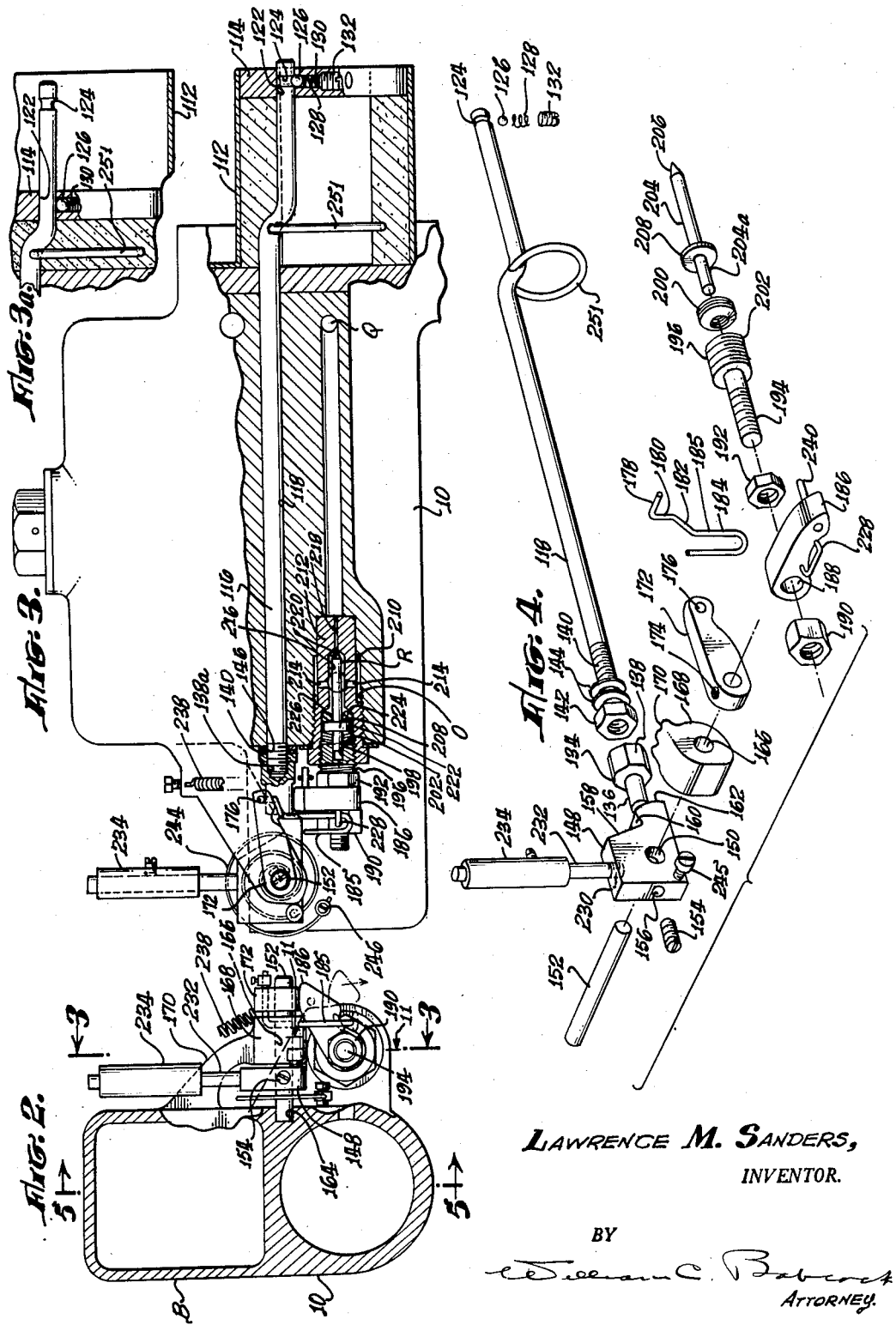

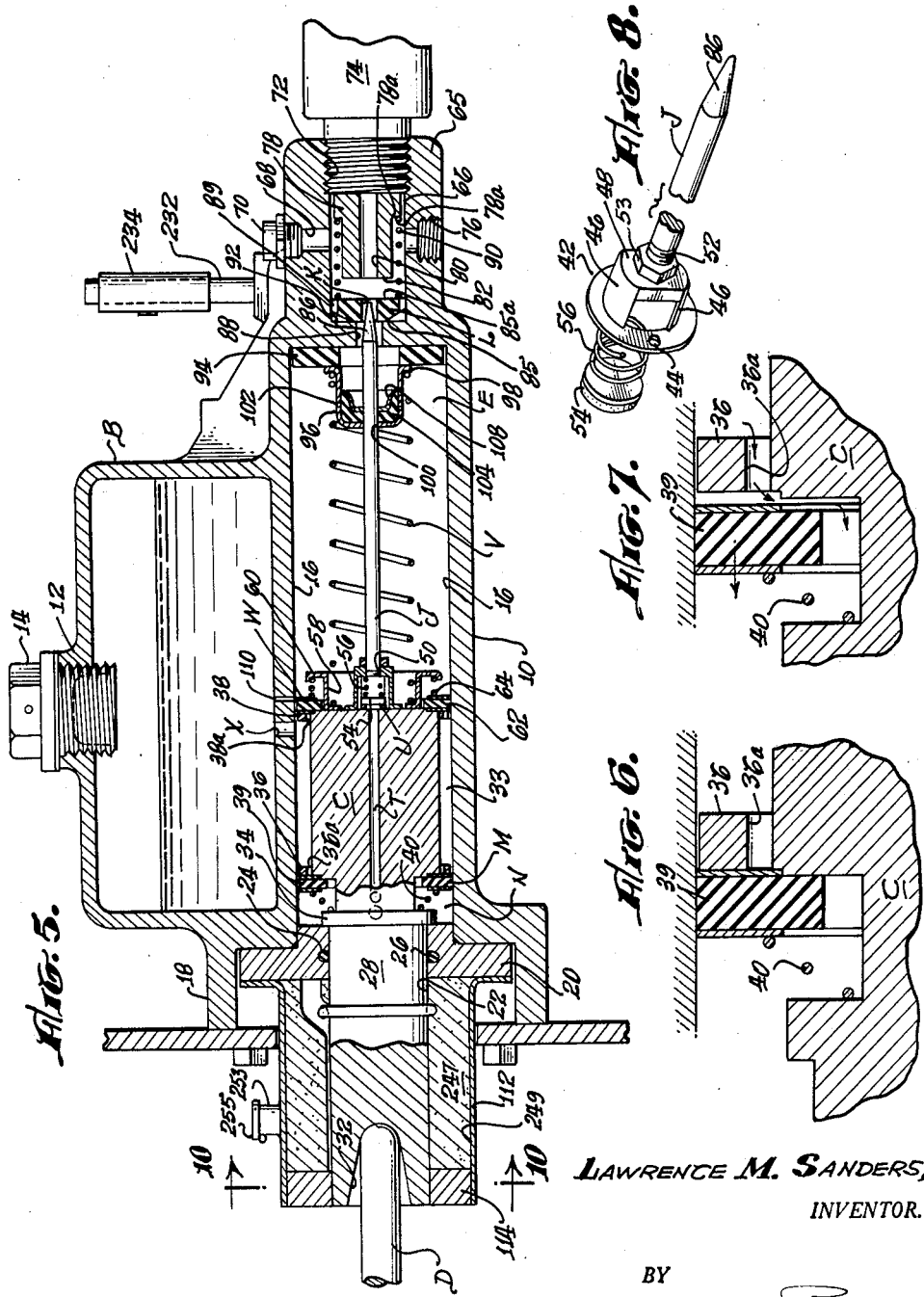

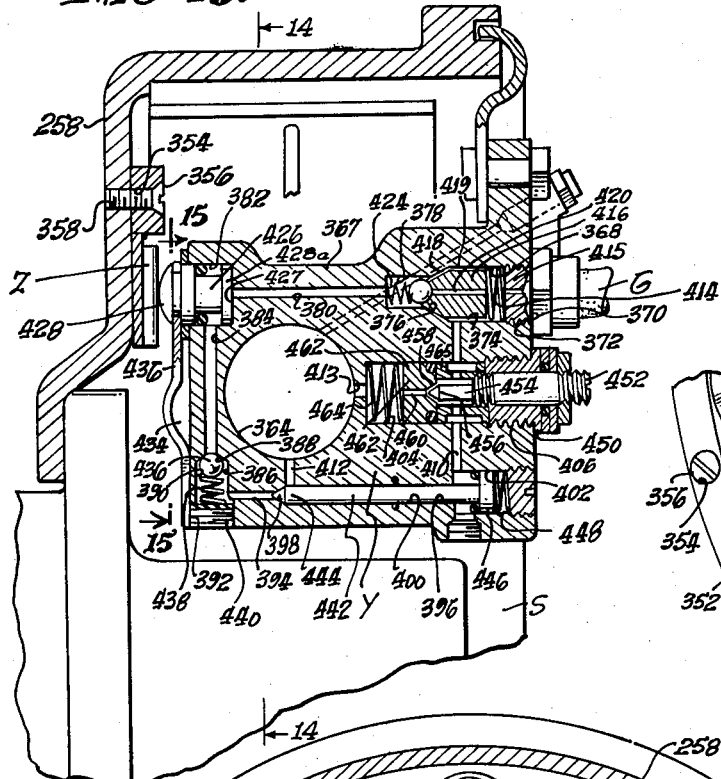
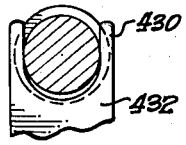
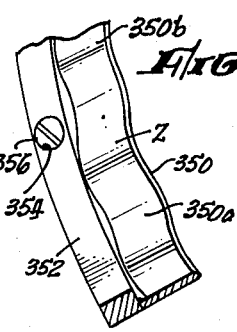
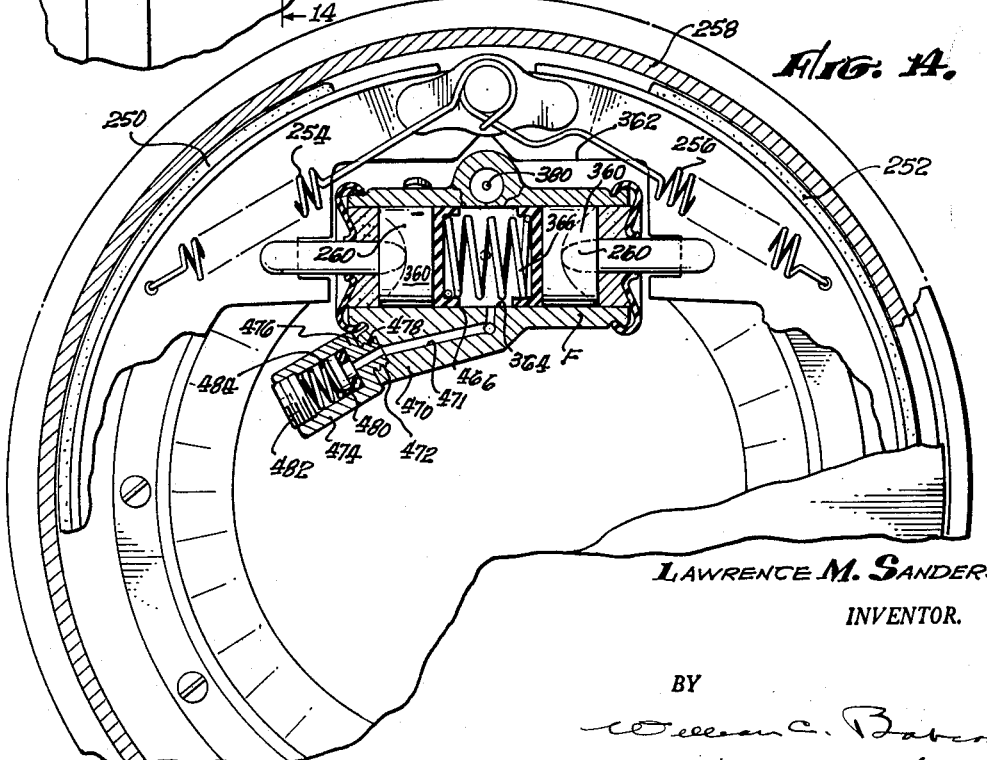

3,144,753
HYDRAULIC BRAKE SYSTEM AND
COMPONENTS THEREOF
Lawrence M. Sanders, 13953 S. Paramount Blvd.,
Bellflower, Calif.
Filed Nov. 10, 1960, Ser. No. 68,465
6 Claims. (Cl. 60—54.6)

The present invention relates generally to the field of brakes, and more particularly to an improved hydraulic brake system for automotive vehicles. The use of hydraulically operated brakes is now almost universal, at least on modern passenger automotive vehicles, but while such brakes provides a number of advantages, they have several major disadvantages as well, for which no solution has been found prior to the present invention.

One disadvantage of prior manually operable hydraulic brakes for automotive vehicles is that after a braking operation has been completed by exertion of downward pressure on the brake pedal, the pressure of the hydraulic fluid in the brake system can only be maintained if the pedal is continuously held in this downward position with a substantial force. In the case of heavy vehicles, such a force is difficult to apply and maintain by persons of limited strength, particularly women.

A further disadvantage of previously available hydraulic brakes is that in the event of a panic stop, it is possible to press the brake pedal downwardly momentarily with a greater force to exert a greater pressure on the hydraulic fluid in the braking system than the user can maintain for a sustained period of time.

These operational disadvantages of previously available braking systems have, to a degree, been rectified by the use of power units that actually apply the force to move the piston in the master cylinder and that can sustain whatever pressure the unit develops. Movement of the brake pedal in such a system merely actuates the power unit. Accordingly, movement of the brake pedal in a power-operated brake system requires a minimum of force to be applied thereto. However, many people have found power brakes to be unsatisfactory, for a considerable period of time is required to become adjusted to the use of power operated brakes after being accustomed to the manually operable type. Also, a person of a nervous disposition is inclined to exert downward pressure on the brake pedal of a vehicle equipped with power brakes at a too rapid rate, particularly when a sudden stop has to be made, whereby the wheels of the vehicle are caused to skid, and the vehicle is thrown into an unpredictable erratic course with possible disastrous results. Another disadvantage of power brakes is that the driver is separated from the master cylinder by the power unit, and consequently acquires no "feel" or is unable to gauge the extent of fluid pressure build-up available for actuation of the brakes.

The primary object in devising the present improved hydraulic brake system for automotive vehicles is first, to eliminate the operational disadvantages of manual and power operable brakes outlined above, and second, to supply a system which, without the use of power means, permits a vehicle to be braked by the use of hydraulic fluid under a greater pressure than that the user of the vehicle could sustain for any appreciable period of time by exerting a constant manual force on the brake pedal.

Another object of the invention is to supply a manually operable brake system wherein the brake pedal can be pumped without losing the pressure exerted on the hydraulic fluid therein that resulted from the first downward movement of the brake pedal.

A further object of the invention is to provide a hydraulic brake system in which the first downward movement of the brake pedal subjects the fluid to a first braking pressure which serves to not only actuate the pistons in the brake cylinders to brake the vehicle, but the actuating mechanisms as well, that are energized by the rotating wheels of the vehicle to increase the pressure on the fluid in the brake cylinders, with the fluid in the master cylinder forwardly of the piston therein being subjected to a second greater pressure after initiation of the first pressure by means that are independent of the operation of the wheel-powered mechanisms.

Yet another object of the invention is to provide a hydraulic brake system in which pressure relief means are provided to prevent the build-up of abnormally high fluid pressures in the brake cylinders should the brake shoes come into braking contact with out-of-round brake drums.

A further object of the invention is to provide a hydraulic fluid measuring device for each brake cylinder which assures that the braking surface of each brake shoe occupies substantially the same position relative to the brake drum, even when the shoe is worn, as that the braking surface occupied when the shoe was new.

A still further object of the invention is to provide a hydraulic brake system wherein the pressure on the actuating fluid for the brake cylinders automatically increases from a first to a second pressure, with the rate of this increase being determined by the rate at which the brake pedal is moved downwardly.

These and other objects and advantages of the invention will become apparent from the following description of a preferred form thereof, and from the accompanying drawings illustrating the same in which:

FIGURE 1 is a perspective view of the present brake system installed on a conventional four-wheel automotive vehicle;

FIGURE 2 is a vertical cross-sectional view of an improved master cylinder taken on line 2—2 of FIGURE 1;

FIGURE 3 is a combined side elevational and longitudinal cross-sectional view of the master cylinder shown in FIGURE 2, taken on line 3—3 thereof;

FIGURE 3a is a combined side elevational and longitudinal cross-sectional view of the rear portion of the master cylinder shown in FIGURE 3 after a movable part thereof has moved to a position to actuate the vehicle brakes;

FIGURE 4 is an exploded perspective view of a portion of the master cylinder that controls the rate at which hydraulic fluid is supplied to a second space in the master cylinder;

FIGURE 5 is a longitudinal cross-sectional view of the master cylinder as the piston therein is moved forwardly to subject hydraulic fluid in the system to a first pressure;

FIGURE 6 is an enlarged fragmentary longitudinal cross-sectional view of a movable seal on the piston of the master cylinder that controls flow of hydraulic fluid from the master cylinder reservoir to the second confined space in the master cylinder, with the seal shown in a sealing position;

FIGURE 7 is an enlarged fragmentary longitudinal cross-sectional view of the movable seal on the piston shown in FIGURE 6 after the seal has moved to a position on the forward stroke of the piston where fluid from the reservoir can flow to the second confined space of the master cylinder;

FIGURE 8 is an enlarged fragmentary perspective view of a fluid pressure maintaining valve stem used in the master cylinder shown in FIGURE 5;

FIGURE 9 is a side elevational view of a mechanism that controls the rate of flow of hydraulic fluid under pressure from the first to the second confined space;

FIGURE 10 is a transverse cross-sectional view of the master cylinder taken on line 10—10 of FIGURE 5;

FIGURE 11 is a fragmentary longitudinal cross-sectional view of the master cylinder taken on line 11—11 of FIGURE 2;

FIGURE 12 is a hydraulic fluid measuring mechanism for maintaining the brake shoes on a vehicle wheel at a proper non-braking position relative to the brake drum;

FIGURE 13 is a transverse cross-sectional view of a self-energizing brake cylinder mechanism that utilizes the rotation of the vehicle wheel in the braking of the wheel;

FIGURE 14 is a vertical cross-sectional view of the mechanism shown in FIGURE 13, taken on line 14—14 thereof;

FIGURE 15 is a combined end elevational and vertical cross-sectional view of a portion of the mechanism shown in FIGURES 12 and 13, taken on line 15—15 of FIGURE 13; and FIGURE 16 is a fragmentary perspective view of a portion of one of the cam surface-defining members used on each vehicle wheel.

With further reference to the drawings, it will be seen in FIGURES 1, 3 and 5 that the improved brake system of the present invention includes a master cylinder A having a hydraulic fluid reservoir B and movable piston C. Forward movement of piston C by a manually operable means D subjects hydraulic fluid in a first confined space E to a first pressure that initiates the braking action. This braking action is caused by transmission of the first pressure to hydraulic fluid in the wheel cylinders F, one of which cylinders is shown in detail in FIGURE 13.

In some brake installations, particularly those having a Bendix brake and brake shoes with a wrap-around action, it is desirable to interpose a hydraulic fluid measuring mechanism H in the conduit G adjacent each wheel S, as may be seen in FIGURE 1. The specific structure of one of the mechanisms H is shown in FIGURE 12. However, in this general discussion of the manner in which the present braking system operates, the function of the mechanisms H will be temporarily disregarded.

Piston C (FIGURE 5) has an elongate valve stem J projecting forwardly therefrom that is adapted to seal in a bore K that extends longitudinally through a valve washer L after the piston C has moved forwardly to a predetermined position in the master cylinder A. A particularly novel feature of the invention is that further hydraulic fluid can flow from confined space E to the conduits G when the pressure is increased on the fluid, even after valve stem J is in sealing engagement with bore K. However, hydraulic fluid in conduits G cannot flow back into space E, even when at a much higher pressure than fluid in this confined space, until the valve stem J is out of sealing contact with bore K. Thus, the piston C may be allowed to move rearwardly in the master cylinder A within a limited range without losing the pressure built up on fluid in conduits G. This operational advantage has heretofore been impossible to attain in hydraulic brake systems.

The piston C includes a first check valve M, best seen in FIGURES 6 and 7, that allows hydraulic fluid to flow from reservoir B to a second confined space N located to the rear of piston C as the piston moves forwardly to exert the first pressure on the hydraulic fluid. A second valve O is provided in master cylinder A that is normally closed, as best seen in FIGURES 2, 3 and 4. Valve O acts as a throttling valve, and the degree to which it opens to permit flow of hydraulic fluid from the first confined space E to the second confined space N is determined by the rate at which the piston C is moved forwardly by means D.

The function of hydraulic fluid admitted under pressure into space N is to subject piston C to a second force, which force by further forward movement of piston C is in turn transmitted to hydraulic fluid in conduits G to further increase the pressure thereon. Hydraulic fluid flows from first confined space E through a first passage P (FIGURE 11), through second valve O and through a second passage Q to the second confined space N. Due to the operation of valve O, the orifice R therein is of maximum transverse cross section when the manually operable means D are moved forward slowly and gently, as will be described in detail hereinafter. Under such braking conditions the hydraulic fluid in the first confined space E is gradually subjected to increased pressure until said first pressure is attained as the valve stem J assumes a sealing position with bore K in valve washer L, whereby portions of this fluid thereafter flows through the second valve O to gradually subject the piston C to an increasing force. Thus, the wheels S of the vehicle are not subjected to an abrupt braking action, but one that gradually increases in intensity.

The orifice R of second valve O decreases in transverse cross section in proportion to the increase in rate at which piston C is moved forwardly. It will be obvious that this reduction in transverse cross section limits the rate at which fluid can flow from the first confined space E to the second confined space N, even though the fluid in space E is under a relatively high pressure. The second valve O limits the rate of increase of fluid pressure sufficiently to prevent sudden skidding of the wheels S whereby the possibility that the vehicle will become out of control is substantially avoided. It should be particularly noted that while the second valve O limits the rapidity with which the second force is applied to the fluid in conduits G and to brake cylinders F, it has no effect in regulating the maximum fluid pressure that the piston C can be caused to exert in actuating the brakes.

In FIGURE 5 it will be seen that a passage T extends through piston C and that the forward end of this passage is obstructed by a normally closed spring-loaded second check valve U. When the brake-actuating force is released from the manually operable means D, a compressed spring V in master cylinder A tends to move piston C to the left, whereby hydraulic fluid in the second confined space N discharges through passage T to the first confined space as the check valve U is forced to an open position. A normally closed third check valve W on the forward end of piston C opens when this piston moves from right to left and thereby prevents formation of a partial vacuum in confined space E. As such a vacuum tends to form in space E, it is immediately broken by the flow of hydraulic fluid from reservoir B through a port X and third check valve W into the space E.

In FIGURES 13 to 16 inclusive a mechanism Y is shown, which when actuated by rotation of an undulating cam surface Z mounted on one of the wheels S, builds up fluid pressure in bake cylinder F. This build-up of fluid pressure by actuation of mechanism Y starts as soon as a first pressure is applied to fluid in the brake cylinder F. Subsequently, the fluid in the master cylinder A is subjected to an increasing pressure as soon as the fluid flows from space E to second confined space N. This fluid flow between the confined spaces takes an appreciable length of time. The chief advantage of the mechanism Y is that it serves to build up the pressure in the brake cylinder F during the time the fluid in the master cylinder A is increasing in pressure.

Referring now to FIGURE 5 for the specific structure of the master cylinder A, it will be seen to comprise a body 10 preferably in the form of a casting of a suitable metal or alloy thereof, the upper portion of which casting defines the reservoir B. A tapped boss 12 is formed in the upper portion of reservoir B and is engaged by a conventional threaded plug 14 that is vented to the atmosphere, yet prevents escape of hydraulic fluid from the reservoir.

An elongated cylinder 16 is formed in body 10 below reservoir B. Body 10 also includes a rearwardly extending cylindrical shell 18 in which a closure plate 20 is disposed that is removably held therein by means not shown. A bore 22 extends through plate 20, which has a circumferentially extending groove 24 formed therein.

An O-ring 26, or other resilient sealing member, is disposed in groove 24 that slidably and sealingly engages a rod 28. Rod 28 has a recess 32 formed in the rear end thereof. Recess 32, as can be seen in FIGURES 5 and 10, is defined by flat vertical sides and inwardly and forwardly tapering top and bottom portions. Recess 32 is removably engaged by the rigid manually operable means D that is connected by a linkage system (not shown) to the brake pedal (not shown) of the vehicle on which the present brake system is installed. The forward end of rod 28 is connected to piston C. Situated on rod 28 a substantial distance from the rear face of piston C is a stop ring 34 that normally contacts the forward face of plate 20. Piston C is substantially smaller in transverse cross section than cylinder 16, and this surface-defining cylinder, together with the exterior surface of piston C cooperatively define an annulus-shaped space 33.

Two ring-shaped flanges 36 and 38 project outwardly from the rear and forward edge portions of piston C and are in slidable contact with the interior surface of cylinder 16. A number of ports 36a extend through flange 36, and flange 38 also has a number of ports 38a extending therethrough. First check valve M includes a resilient ring 39 having a diameter sufficient to permit snug, slidable fit thereof within the confines of cylinder 16. A compressed helical spring 40 is disposed in the second confined space N. One end of spring 40 bears against the rear face of the resilient ring 39, and the other end thereof abuts against the forward face of the stop ring 34. Spring 40 at all times maintains the resilient ring 39 in pressure fluid-sealing contact with the rear face of flange 36 which obstructs the bores 36a extending therethrough, as may best be seen in FIGURE 6.

A ring-shaped member 42, (FIGURE 8) is affixed by screws 44, or other fastening means, to the forward face of piston C in a position to encircle the forward extremity of the passage T extending through the piston. Member 42 has two parallel, laterally spaced legs 46 extending forwardly therefrom that support a cross piece 48 on the forward end thereof. A tapped bore 50 is formed in cross piece 48 that threadedly engages a rear threaded end 52 of the valve stem J. A lock nut 53 is provided, which when tightened against the forward face of the cross piece 48 and in engagement with the threaded end 52, serves to rigidly maintain the valve stem J in a forwardly projecting position, as shown in FIGURE 5.

The second check valve U includes a resilient plate 54 that is held in pressure contact with the forward face of the piston C by a compressed helical spring 56. The rear end of spring 56 is in abutting contact with plate 54, and the forward end of this spring bears against the rear face of the cross piece 48. Value U is normally in a closed position. A cylindrical shell 58 is rigidly affixed to the forward face of piston C by conventional means (not shown), and the forward end of this shell develops into a ring-shaped flange 60 which is parallel to the forward face of piston C.

The third check valve W is defined by a resilient ring-shaped member 62 that is at all times pressed rearwardly into abutting contact with the forward face of the flange 38 to obstruct the bores 38a extending therethrough. This rearward urging of member 62 is effected by a compressed helical spring 64, the rear end of which is in abutting contact with the forward face of member 62, and the forward end of this spring bears against the rear face of flange 60.

The body 10 includes a forwardly disposed extension 65 that closes the forward end of cylinder 16. An enclosed space 66 is formed in the interior of extension 65 and is in communication with a tapped bore 68, which is closed by a threaded plug 70. A second tapped bore 72 is formed in extension 65 that is engaged by the threaded end of a conventional, normally closed pressure-actuated electric switch 74, which switch when hydraulic pressure is applied thereto, completes an electric circuit to the tail light of the vehicle when the brakes are applied. Also, a third tapped bore 76 is provided in extension 65 that communicates with the enclosed space 66 and is connected by a suitable coupling (not shown) to one of the conduits G.

A tubular spacer member 78 is situated within the confines of space 66, and has a longitudinally extending bore 80 formed therein that is in coaxial alignment with the valve stem J. Spacer member 78 is removably held within the confines of enclosed space 66 as it is affixed to the pressure switch 74, or by other conventional means not shown. The rear end of spacer member 78 terminates in a flat ring-shaped face 82, as may best be seen in FIGURE 5. Valve stem J has a tapered pointed forward end 86. The enclosed space 66 communicates with a longitudinally extending bore 88 formed in the rearward portion of extension 65, which bore extends to the forward end of cylinder 16. The transverse cross section of bore 88 is somewhat larger than that of the valve stem J to the rear of the pointed end 86 thereof.

Situated in the forward end of the cylinder 16 and bearing against the rear face of extension 65 is a ring-shaped resilient member 94. A rigid thimble 96 is positioned in first confined space E as shown in FIGURE 5, which has a circumferentially extending rim 98 that is engaged by the forwardly disposed end of spring V. The rear end of spring V abuts against the forward face of piston C. A bore 100 is formed in the center of thimble 96 through which valve stem J projects and is slidably movable relative thereto. A number of ports 102 are formed in the sides of thimble 96. A resilient liner 104 is situated within thimble 96, and a resilient member 108 at all times urges this liner into contact with the interior surface of the thimble to cover the ports 102.

Valve washer L has a number of circumferentially spaced, longitudinally extending grooves 89 formed on the circumferential edge thereof. When piston C is moved forwardly in cylinder 16, fluid in the cylinder is admitted into the confines of thimble 96 by flowing through the ports 102 and pressing the liner 104 inwardly. The fluid then passes forwardly between the liner and interior surface of the thimble, through the ring-shaped member 94, bore K in washer L, and thence through the enclosed space 66 to discharge through the tapped bore 76 into conduit G.

After the valve stem J has moved forwardly to the extend that the bore K snugly and sealingly engages the portion thereof rearwardly from the pointed end 86, the valve washer L is moved forwardly sufficiently by fluid pressure in bore 88 against the compression of spring 90 to permit fluid flow between the rear face 85 of the washer and the forward face 92, discharge thereof through the grooves 89 into the enclosed space 66 to pass into conduit G. However, the pressure built up on fluid in conduit G is not lost if the force on piston C is released when the operator allows the manually operable means D to move rearwardly, so long as this rearward movement is insufficient to move valve stem J out of fluid sealing engagement with bore K. So long as valve stem J remains in fluid sealing engagement with bore K, the pressure built up on the fluid in conduit G and brake cylinders F will cause the same pressure to be exerted on fluid in the enclosed space 66. This fluid bears against the forward face 85a of the valve washer L, and moves the washer rearwardly so that the rear face 85 thereof is in pressure sealing contact with the ring-shaped surface 92 that defines the rear extremity of enclosed space 66.

When the pointed end portion 86 begins to move from bore K, fluid then discharges through bore K, bore 88, and into the thimble 96. However, due to the resiliency of liner 104, fluid cannot escape through ports 102. The fluid in thimble 96 exerts a sufficient rearward force thereon to further compress spring V whereby the thimble then moves rearwardly, and the fluid flows under the rim 98.

When the valve stem J has been moved rearwardly sufficiently the pointed end 86 begins to move from the bore K, and shortly thereafter the piston C moves to a position such as that shown in FIGURE 5 where a port 110 formed in the wall separating the cylinder 16 and reservoir B is uncovered, and fluid under pressure in cylinder 16 can pass into the vented reservoir B. In the event a vacuum tends to form in the first confined space E as the piston C moves to the left, this vacuum is quickly broken by the third check valve W which moves to the right relative to piston C, in the same manner as the first check valve M moves to the left should a vacuum tend to form in the second confined space N.

A tube 112 (FIGURE 5) is affixed by conventional means to the rear face of the plate 20 and extends rearwardly therefrom. The interior cross section of tube 112 is substantially larger than the transverse cross section of rod 28. A collar 114 is affixed to the rear end of rod 28, which collar is in snug, slidable contact with the interior surface of tube 112.

In FIGURE 3 it will be seen that a rod 118 is slidably mounted in a bore 116 that extends longitudinally in body 10. The rear portion of rod 118 projects through a bore 122 formed in collar 114. A circumferentially extending groove 124 is formed in the rear end portion of rod 118, and when the collar 114 is in the rearwardly disposed position shown in FIGURE 3, the groove 124 is removably engaged by a ball 126. Ball 126 is at all times urged upwardly into contact with groove 124 by a compressed helical spring 128 situated in a bore 130 formed in collar 114. The outer portion of bore 130 is tapped, and removably closed by a threaded plug 132.

A cam actuating member 134 is provided (FIGURE 4) that comprises a short rod portion 136, the rear end of which develops into an enlarged portion 138 having a longitudinally extending tapped bore 138a formed therein that is adapted to be engaged by the threaded forward end 140 of rod 118. After threaded end 140 engages tapped bore 138a a lock nut 142 is tightened against rod portion 138, which nut serves to rigidly hold the cam actuating member 134 and rod 118 together as an integral unit. Two spacers 144 (FIGURE 3) are situated between the rear face of nut 142 and the forward face 146 of body 10.

A rigid block 148, shown in FIGURE 4, has a transverse bore 150 formed therein through which a shaft 152 can be projected. Block 148 can be removably locked to shaft 152 by a set screw 154 that threadedly engages a tapped bore 156. The block 148 has a downwardly and rearwardly tapering face 158, the lower edge of which develops into a rearwardly projecting surface 160. The surface 160 in turn merges with a convex downwardly extending cam surface 162.

One end of shaft 152 is rotatably supported in a recess 164 formed in the housing body 10, as may best be seen in FIGURE 2. An intermediate portion of shaft 152 is rotatably mounted in a bore 166 that extends transversely through the enlarged lower end portion 168 of an arm 170 which extends downwardly from reservoir B (FIGURES 2 and 4). That portion of shaft 152 disposed outwardly from the enlarged portion 168 of arm 170 has a lever 172 rigidly affixed thereto by means of a set screw 174, or other conventional means. The rear end of lever 172, as shown in FIGURE 3, has a transverse bore 176 formed therein. Bore 176 is engaged by a horizontally disposed leg 178 formed of wire or the like, and develops into a downwardly and forwardly extending portion 182, which in turn develops into a hook 184. This wire hook-defining member is identified generally by the numeral 185. An arm 186 having a transverse bore 188 extending therethrough is held by two lock nuts 190 and 192 on an elongate, externally threaded member 194. The rear end of threaded member 194 develops into an externally threaded enlarged portion 196 in which a cylindrical recess 198 extends forwardly, as shown in FIGURE 3.

Belleville cone spring washers 200 are so positioned as to abut against the rear face 202 of the enlarged portion 196. An elongate valve stem 204 having a pointed tapered rear portion 206 is provided, which valve stem has a pressure plate 208 intermediately disposed thereon. A portion 204a of valve stem 204 located forwardly on plate 208 is adapted to extend through the washers 200 into the recess 198, as best seen in FIGURE 3. A longitudinally positioned, rearwardly extending cavity 210 is formed in body 10 (FIGURES 3 and 11) that communicates with the first and second passages P and Q respectively.

As shown in FIGURE 3, the second valve O includes an elongate body 212 having an externally threaded surface that engages a tapped forward portion of cavity 210. Two oppositely disposed transversely positioned fluid passages 214 are formed in body 212 that are at all times in communication with first passage P and a bore 216 also formed in body 212. The bore 216 is substantially larger in transverse cross section than the valve member 204 positioned therein. A counterbore 218 is provided in the rear portion of body 212 that is in coaxial alignment with bore 216. A conical shoulder 220 is formed in body 212 at the junction of bore 216 and counterbore 218.

The forward end of bore 216 develops into an enlarged second bore 222, the forward portion of which is tapped. The enlarged threaded portion 196 connected to threaded member 194 threadedly engages the tapped portion of second bore 222. The plate 208 and washers 200 are disposed in the rear of bore 222. A resilient sealing ring 224, best seen in FIGURE 3, encircles the valve stem 204 and is positioned between the rear face of plate 208 and a body shoulder 226 formed at the junction of bores 216 and 222. The arm 186 (FIGURE 4) has a U-shaped member 228 projecting outwardly from the forward face thereof, and a portion of this U-shaped member as shown in FIGURES 2 and 3, is located within the confines of the hook 184.

A tapped bore 230 extends downwardly in block 148 that is engaged by the lower threaded end of a rod 232, on the upper portion of which a vertically adjustable weight 234 is mounted.

When the rod 28 is moved forwardly by the manually operable means D, the rod 118 is removably locked by the ball 126 to the collar 114 which moves concurrently with the rod 28. If the movement of the manually operable means D is relatively slow, the cam actuating member 134 will move forwardly into pressure contact with the cam face 162 to cause rotation of the block 148 and weight 234 in a clockwise direction, as shown in FIGURE 3, with concurrent rotation of the shaft 152 and lever 172. Rotation of block 148 ceases when the cam actuating member 134 has moved to a position where the surface 160 defined on block 148 is situated thereunder. In this manner rotation of shaft 152 and lever 172 results in the lever 172 contacting the upper portion of arm 186 to rotate the arm and the threaded member 194 locked thereto. Rotation of lever 172 in a clockwise direction, as shown in FIG. 4, results in the hook 185 moving downwardly faster than the U-shaped member 228 on arm 186 as the arm is rotated by contact with lever 172.

Rotation of the threaded member 194 causes rotation of the large threaded portion 196 in the valve body 212 to force the portion 196 rearwardly, whereby the spring washers 200 are compressed as they tend to move plate 208 rearwardly against the resilient ring 224. This force exerted on the plate 208 tends to move the tapered end 206 of the valve stem 204 rearwardly nearer the shoulder 220 to restrict the area of orifice R. Orifice R is the space of frusto-conical shape defined between the surface of the pointed end 206 of the valve stem and shoulder 220, as best seen in FIGURE 3. When the block 148 is rotated as described hereinabove, the valve stem 204 is moved rearwardly a minimum distance whereby the orifice R is of maximum cross section. Consequently, hydraulic fluid in the first confined space E under relatively low pressure can flow therefrom through passage P, valve O and passage Q to second confined space N.

However, if the manually operable means D is caused to move the rod 28 (FIGURE 5) forwardly at a rapid rate, such as would occur at the time of a panic stop, the rod 118 is rapidly advanced forwardly and the cam member 134 then strikes the cam face 162 a sharp blow which pivots the block 148 clockwise, as seen in FIGURES 3 and 4, until the face 158 contacts the forward face of the cam member 134 of block 148, as shown in FIGURE 9. The clockwise rotation of block 148 to this maximum position is due to the kinetic energy imparted to the block by sudden rotational acceleration of the weight 234. The kinetic energy so imparted to weight 234 rotates the block 148, shaft 152 and arm 170 to cause hook 185 to strike the upper portion of arm 186 and pivot the same into a maximum downward position as shown in phantom line in FIGURE 2.

This rotation of arm 186, of course, results in concurrent rotation of the threaded member 194 and enlarged threaded portion 196, to move the threaded portion 196 rearwardly and place the spring washers 200 under maximum compression as the washers urge the plate 208 rearwardly, together with the valve stem 204 and decrease the cross section of orifice R. This decrease in size of orifice R retards the rate of flow of hydraulic fluid from first confined space E to second confined space N, even though the pressure on the fluid in the first confined space has increased materially over the pressure thereon in the illustration given above. However, the cross section of orifice R will be increased above the initial setting made by the first rearward movement of valve stem 204, with this increase being dependent on the fluid pressure of the fluid in confined space E. Fluid from confined space E exerts pressure on resilient ring 224, which in turn is transmitted to plate 208 and then to washers 200, and washers 200 are further deformed whereby the valve stem 204 can move to the left to increase the cross section of orifice R.

In summary, as the initial pressure is increased in first confined space E, the rate at which the fluid is permitted to discharge through the valve O is decreased in order that the build-up of breaking pressure in the brake cylinders F will be gradual rather than sudden as the second phase of the braking action occurs. After the braking action has been completed, and force is released from the manually operable means D, the compressed helical spring V in first confined space E returns the piston C to the position shown in FIGURE 5. Rearward movement of piston C to the position shown in FIGURE 5 results in concurrent rearward movement of rod 28 and collar 114. As the collar 114 moves rearwardly from the position shown in FIGURE 3a to that shown in FIGURE 3, the ball 126 engages the grooves 124 to return the actuating rod 118 to the position also shown in FIGURE 3. When the actuating rod 118 occupies the position shown in FIGURE 3, the cam actuating member 134 is no longer in contact with block 148.

A helical spring 238 is provided (FIGURE 2) that extends downwardly from a convenient position on the reservoir B to engage a pin 240 projecting from the arm 186. Spring 238 is relatively light, and has just sufficient tension thereon to maintain the arm 186 in a substantially horizontal position. The arm 186 is returned to the horizontal position at the time the hook-defining member 185 engages the U-shaped member 228 when concurrent pivotal movement of the block 148, shaft 152, and lever 172 takes place in a counter-clockwise direction. This counter-clockwise rotation is effected by means of a helical spring 244 (FIGURE 3) that is at all times under tension, one end of which is affixed by a screw 245 or other fastening means to the block 148. The other end of the spring 244 is affixed by a screw 246 to a convenient position on the forward portion of body 10. The spring 244 at all times tends to pivot the block 148 to the position shown in FIGURE 3 where the rod 232 is vertically disposed. Thus, when the rod 118 returns to the position shown in FIGURE 3, the spring 244 automatically pivots block 148, shaft 152, and lever 172 counter-clockwise from the position shown in FIGURE 9 to that shown in FIGURE 3.

By use of master cylinder A, hydraulic fluid is first applied from the first confined space E to the conduits G at a first pressure. Thereafter, this pressure gradually increases as hydraulic fluid flows from space E to second confined space N through the second valve O to exert additional force on piston C. Obviously, this additional force on piston C increases the pressure on fluid in conduits G, with consequent increased braking action on wheels S of the vehicle.

To lubricate the entire exterior surface of rod 28 (FIGURE 5), a resilient porous oil-containing body 247 is provided, positioned in the confined space 249 within tube 112. The resilient body 247 is compressed with each forward movement of rod 28, as shown in FIGURE 3a, and lubricant in body 247 is brought into contact with the surface of rod 28. Also, for guide purposes, a guide ring 251 is preferably affixed to rod 118, and this ring encircles the rod 28, as shown in FIGURE 10. Liquid lubricant can be introduced into tube 112 through an inlet 253 on the top thereof that is normally closed by a cap 255.

The single brake cylinder F shown in FIGURE 14 actuates two internal, double lever-mounted brake shoes 250 and 252 that are pivotally supported by means not shown, and are at all times urged to occupy a non-braking position by two tensioned helical springs 254 and 256. When the brake shoes 250 and 252 are new they are relatively close to the brake drum 258 when in a non-braking position, but as the shoes wear, the distance between the shoes and drum increases. This increase in distance between the shoes 250 and 252 and drum 258 is undesirable, for the two pistons 260 in brake cylinder F must travel a greater distance to actuate the brake shoes 250 and 252, necessitating discharge of a greater quantity of hydraulic fluid into the cylinder F to accomplish this result.

Increased flow of hydraulic fluid requires a greater movement of the brake pedal (not shown) to move the manually operable means D. With most hydraulic brakes, particularly those on automotive vehicles, eccentrics or cams (not shown) are provided, which when pivoted, control the positions to which the brake shoes move after pressure is released from hydraulic fluid in the brake cylinder with which the shoes are associated. However, the disadvantage of these cams or eccentrics is that they are difficult and inconvenient to reach, and require a specialized knowledge if they are to be properly adjusted to compensate for wear. Close positioning of brake shoes 250 and 252 in non-braking positions relative to drum 258, both when the shoes are new, as well as after they become worn, is attained by use of the hydraulic fluid measuring mechanism H shown in FIGURE 1.

One of the mechanisms H is preferably provided for each wheel S. Each mechanism H is inserted in one of the conduits G leading to one of the brake cylinders F. In FIGURE 12 it will be seen that each mechanism H comprises a cylindrical shell 262 having a closed end 264 in which a tapped bore 266 is formed that serves as a fluid discharge passage. Tapped bore 266 is connected by conventional fittings 268 to one of the conduits G leading to a brake cylinder F. Shell 262 has an open end 270 that is removably closed by a cap 272 that is removably affixed thereto by screws 274 or other conventional fastening means. A first bore 276 extends through cap 272 and threads 278 are formed in the outer end portion thereof. A second tapped bore 280 is formed in cap 272. Bore 280 serves as a fluid inlet passage and is connected by conventional fittings 281 to one of the conduits G communicating with master cylinder A. A piston 282 is slidably mounted in shell 262, and first, second and third coaxially aligned bores 284, 286 and 288 respectively extend longitudinally through this piston. A body shoulder 290 is defined at the junction of first and second bores 284 and 286. Also, second and third bores 286 and 288 define a body shoulder 292 at the junction thereof.

A valve member 294 is provided that is defined by a cylindrical side wall 296 in which a number of circumferentially spaced, longitudinally extending grooves 298 are formed. The rear extremity of member 294 terminates in a flat face 300. The forward portion of member 294 is defined by a conical face 302, the center of which develops into a semi-circular recess 304. Recess 304 communicates with a bore 306 that extends longitudinally through the valve member 294.

A plate 308 is removably affixed to end 310 of piston 282. A number of openings 312 are formed in the center of plate 308 through which fluid can flow into third bore 288. A compressed helical spring 314 urges valve member 294 toward shoulder 292 and maintains face 302 of the valve member sealingly seated thereon. One end of a second compressed helical spring 316 of very light construction abuts against shoulder 290, with the other end thereof pressing against a ball 318 that is normally sealingly seated in recess 304.

A rod 320 which acts as a stop to limit the movement of piston 282 toward cap 272 is positioned in bore 276. Threads 322 are formed on rod 320 that engage threads 278 of the first bore. Rotation of rod 320 is achieved by use of a transverse slot 324 formed in the outer end thereof. A lock nut 326 engages threads 322 to maintain rod 320 at a desired longitudinal position relative to cap 272. The rod 320 preferably has a groove 328 formed therein in which a resilient ring 330 is disposed to seal with the interior surface of bore 276. Piston 282 also has a circumferentially extending groove 332 formed therein in which a resilient ring 334 is disposed to sealingly engage the interior surface of shell 262.

A tapped bore 336 is formed in the upper portion of shell 262 forwardly of piston 282 which is normally sealed by a bolt 338 and resilient washer 338a disposed on the exterior of the shell. By removing the bolt 338 from bore 336 any air in conduit G and shell 262 to the left of piston 282 can be bled therefrom. Piston 282 and shell 262 cooperatively serve to separate hydraulic fluid in the shell and conduit G to the left of piston 282 from hydraulic fluid in the shell and conduit to the right of the piston.

Rod 320 is so adjusted that when the inwardly disposed end 320a thereof is contacted by plate 308 on the piston, the springs 254 and 256, best seen in FIGURE 14, have moved brake shoes 250 and 252 to non-braking positions where the braking surfaces thereof are separated from the interior surface of drum 258 by substantially the same distances the braking surfaces occupied when the brake shoes were new.

When the manually operable means D shown in FIGURE 5 is moved forwardly, pressure is placed on the hydraulic fluid in shell 262 to the right of piston 282. The piston then moves to apply pressure to the fluid in the interior of shell 262 and that portion of the conduit G to the left of the piston, as well as in the particular brake cylinder F to which this portion of the conduit is connected.

This movement of piston 282 causes the two pistons 260 in brake cylinder F to move in opposite directions to pivot the brake shoes 250 and 252 into braking positions. If the interior portion of shell 262 to the left of piston 282, together with the portion of conduit G and the particular brake cylinder F connected thereto are filled with fluid, no fluid will flow from the right-hand side of piston 282 to the left-hand side thereof when the braking action is initiated. However, should that interior portion of shell 262 to the left of piston 282 and the portions of conduit G and brake cylinder F connected thereto not be filled with fluid, the ball 318 will be displaced from sealing contact with recess 304 prior to movement of piston 282. Fluid will then flow through bore 306 until the interior portion of the shell to the left of the piston, the conduit G connected thereto, and the paricular brake cylinder F conneced to that portion of conduit is filled with hydraulic fluid. Thereafter, the compressed helical spring 316 will move the ball 318 to the right to place it in sealing contact with recess 304. Only a small force need be exerted by spring 316 on ball 318 to so return the same to such sealing contact, for when the interior portion of the shell 262 is filled with fluid the hydraulic pressure on both the left and right sides of the ball is the same.

Should the volume of hydraulic fluid to the left of piston 282 in shell 262, conduit G connected thereto, as well as the particular brake cylinder F connected to this portion of conduit increase, such as by high temperature of the ambient atmosphere, and should this increase in volume occur when the piston occupies a position where it is in abutting contact with the end 320a of rod 320, the increased pressure on hydraulic fluid to the left of piston 282 will cause valve member 294 to be displaced from shoulder 290. Hydraulic fluid to the left of piston 282 can then flow through first and second bores 284, 286 and grooves 298 to the right-hand side of the piston as shown in FIGURE 12, until pressure equilibrium is established.

Assuming that the piston 282 remains in contact with end 320a of rod 320 and the ambient temperature cools, the hydraulic fluid in the space in shell 262 to the left of piston 282 (FIGURE 12) will contract in volume, as will the fluid in the portion of conduit G connected to this space, together with the fluid in the particular brake cylinder F connected to this portion of conduit. The space in the system to the left of piston 282 will not then be completely filled with hydraulic fluid, but this is unimportant, for when fluid pressure is exerted on the right-hand end of piston 282, the ball 318 will be momentarily displaced from its seated position in recess 304. During this displacement of ball 318, fluid will flow from the right-hand side of piston 282, as shown in FIGURE 12, to the left-hand side thereof until that portion of the system on the left-hand side of the piston is completely filled with fluid as described in detail hereinabove.

The mechanism Y shown in detail in FIGURES 13, 15 and 16 is preferably formed as an integral part of the brake cylinder F and supported therefrom. The undulating cam Z is defined by a ring 350 having a flange 352 projecting from one circumferential edge thereof. A number of circumferentially spaced openings 354 are formed in flange 352 through which screws 356 extend to engage tapped bores 358 formed in the brake drum 258 attached to wheel S.

Brake cylinder F (FIGURES 13 and 14) includes a body 362 in which a bore 364 is formed in which the two oppositely moving brake pistons 360 are mounted and at all times separated from one another by a helical spring 366 situated therebetween. A first cavity 368 is formed in body 362 and extends inwardly from a side 370 thereof. Threads 372 are formed on the outwardly disposed portion of cavity 368. That portion of first cavity 368 inwardly from threads 372 is defined by a cylindrical surface 374 which develops into a conical face 376 that merges with a cylindrical side wall to define an extension 378 of the cavity.

A first fluid passage 380 connects cavity extension 378 with a second cavity 382 also formed in body 362. The second cavity 382 is connected by a second fluid passage 384 to a third cavity 386 formed in body 362. Cavity 386 is defined by a conical face 388, a cylindrical side wall 390 and a tapped portion 392. A third fluid passage 394 extends from the side wall 390 of cavity 386 to an elongate fourth cavity 396 that is defined by a conical surface 398 and a cylindrical side wall 400. The fourth cavity 396 merges with a fifth cavity 402 of larger transverse cross section that is formed in body 362.

A sixth cavity 404 is formed in body 362 between the first and fifth cavities, and this sixth cavity has threads 406 formed in a portion thereof. First cavity 368 is connected to the sixth cavity 404 by a fourth fluid passage 408. Sixth cavity 404 is connected to the fifth cavity 402 by a fifth fluid passage 410. The fourth cavity 396 is connected to bore 364 in which pistons 260 are disposed by a sixth fluid passage 412. A seventh fluid passage 413 connects the sixth cavity 404 to bore 364.

Threads 372 of first cavity 368 are engaged by a conventional fitting 415 that is connected to a portion of conduit G. This portion of conduit G is also connected to the fluid discharge fitting 268 in the shell 262, as may best be seen in FIGURE 12. A compressed helical spring 414 in first cavity 368 at all times tends to move a valve member 416 which has a tapered face 418 to a position where this face seats on surface 376 and effects a fluid seal therewith. When the valve member 416 is so seated fluid can flow from fitting 415 through longitudinally extending grooves 419 formed on the valve member to fourth fluid passage 408. A bore 420 extends through valve member 146, and the end of this bore most remote from spring 414 is normally obstructed by a ball 422 that is held in this position by a second spring 424.

A plunger 426 is slidably mounted in second cavity 382, which plunger has a grooved head 428 that is engaged by a bifurcated end 430 of a leaf spring 432. The lower end of spring 432 is affixed to a side 434 of body 362. Spring 432 is of such shape that it normally holds head 428 out of contact with cam Z. A second cylindrical head 428a of lesser transverse cross section than cavity 382 is included as a part of plunger 426, as may best be seen in FIGURE 13. The second head is held in sealing contact with a shoulder 427 until the pressure on fluid in conduit 380 moves the plunger to the left as shown in FIGURE 13. Fluid from conduit 380 can then enter cavity 382 to exert a pressure on the grooved head 428.

A ball 436 is seated in cavity 386 which tends to be held in a fluid obstructing position on conical face 388 by a compressed helical spring 438. The lower end of spring 438 abuts against a threaded plug 440 that engages the tapped portion 392. An elongate valve member 442 having a tapered end portion 444 and enlarged head 446 is provided, and the portion 444 thereof is slidably and sealingly mounted in fourth cavity 396. The valve member 442 is at all times urged toward third cavity 386 by a compressed helical spring 448 that bears against head 446 disposed in the fifth cavity 402. The tapered end portion 444 is normally seated on the conical face 398.

An externally and internally threaded tubular body 450 is mounted in the sixth cavity 404, and a threaded rod 452 is rotatably mounted in this body. A pin 454 projects from rod 452 into the sixth cavity 404. Pin 454 has a tapered end 456, which by rotation of rod 452, can be brought into desired proximity relative to the tapered end 458 of a bore 460 that extends longitudinally through a piston 462 mounted in the sixth cavity 404. A compressed helical spring 464 tends at all times to maintain the piston 462 in abutting contact with a tubular stop 465 in the sixth cavity 404.

Hydraulic fluid in the mechanism Y when the manually operable means D moves the piston C forwardly in master cylinder A will be subjected to a first pressure. This first pressure is that exerted on fluid by the piston in first confined space E prior to the time the valve stem J effects a fluid seal with bore K in valve washer L, as may be seen in FIGURE 5. Fluid in conduit G shown in FIGURE 13 will flow therefrom through grooves 419 to the fourth fluid passage 408, and thence to the sixth and fifth cavities 404 and 402 respectively. Fluid cannot flow from the fifth cavity 402 at any time, for the valve member 442 is slidably and sealingly disposed therein. Fluid flows from the sixth cavity 404 between the tapered end 456 of pin 454 and the tapered end 458 of bore 460 in piston 462 and bore 364 of the brake cylinder F, as can best be seen in FIGURES 13 and 14.

When fluid in the fifth cavity 402 exceeds a predetermined pressure, this pressure on head 446 causes the valve member 442 to move to the right to establish communication between fluid passages 394 and 412. Concurrently, this first pressure on the fluid in first cavity 368 causes the ball 422 to be moved to the left, with fluid then flowing through bore 420, extension 378, and first passage 380 to second cavity 382. Hydraulic fluid in the second cavity 382 at this first pressure moves the plunger 426 to the left into contact with the cam surface 350, as best seen in FIGURE 13.

As a result of contact with cam surface 350, the plunger 426 is reciprocated in the second cavity 382, and discharges fluid through the second passage 384 to move ball 436 downwardly by further compressing spring 438. Thereafter, fluid discharges from the third cavity 386 through the third passage 394 and the sixth fluid passage 412 into brake cylinder F to increase the pressure on the hydraulic fluid therein. This increase of fluid pressure in brake cylinder F is particularly important in the braking of automotive vehicles traveling at a high rate of speed. As the fluid pressure in bore 364 of the brake cylinder F increases above that in the sixth cavity 404, the piston 462 moves to the right in the cavity until it abuts against stop 465, and the cross section of the space between the tapered end 456 of pin 454 and tapered end 458 of bore 460 is lessened as a result thereof.

From an inspection of the mechanism Y shown in FIGURE 13, it will be apparent that the plunger 426 sequentially builds up the pressure on fluid in bore 364. Fluid must first flow through first passage 380 into second cavity 382 with sufficient force to move plunger 426 to the left against the resiliency of spring 432 to position head 428 in one of the low portions 350a of cam Z. One of the raised portions 350b of cam Z then moves the plunger 426 to the right, whereby fluid is discharged through second passage 384 to move ball 436 downwardly out of sealing engagement with the tapered face 388. Spring 438 immediately returns ball 436 to a sealing position with face 388 after the portion of fluid discharged through second passage 384 passes thereby.

The spring 432 then moves plunger 426 to the left, but not to the extent that head 428 is in contact with cam Z. The fluid pressure in first cavity 368 is then greater than that on fluid remaining in second cavity 382, and the ball 422 is again moved to the left to prevent further fluid flow from the first cavity 368 to the second cavity 382. The pressure on the fluid admitted to the second cavity 382 again moves the plunger 426 to the left to place the head 428 thereof in one of the low portions 350a of the cam Z whereupon the previously described operation is repeated to further increase the flow of fluid to bore 364 and increase the pressure on fluid therein.

In the operation of the mechanism Y, there are three possible pressure conditions on the fluid that may arise:

a. Pressure on fluid in bore 364 is greater than pressure on fluid in first cavity 368.
b. Pressure on fluid in bore 364 is less than pressure on fluid in first cavity 368.
c. Pressure on fluid in bore 364 and pressure on fluid in first cavity 368 are equal.

Under the first condition, the pressure on fluid in bore 364 will cause piston 462 to be moved to the right, whereby the piston assumes a position in the sixth bore that is determined by the magnitude of a force built up by back pressure on the fluid as it enters the bore 404 in the piston, the magnitude of a force built up by the fluid as it escapes from the bore 404 between the tapered faces 456 and 458, and the differential in fluid pressures on the two end surfaces of the piston.

Discharge of fluid at higher pressure from bore 364 to sixth cavity 404 will result in fluid flow through the fourth fluid passage 460 to first cavity 368 to increase the pressure on fluid in the first cavity. This increase of pressure on the fluid in first cavity 368, together with flow of additional fluid thereto from conduit G, results in two possibilities. If the rate of fluid flow from the sixth cavity 404 to the first cavity 368 is greater than the rate at which the plunger 426 can pump fluid, a portion of this increased fluid flow will pass to the right through the conduit G connected to the first cavity toward the mechanism H. This flow through conduit G to mechanism H will continue until the pressure on fluid on the right-hand side of piston 282 (FIGURE 12) equals the pressure on fluid to the left of the piston.

When the rate of flow of fluid from the sixth cavity 404 to first cavity 368 is less than the rate at which plunger 426 can pump the fluid, the fluid will flow to the first cavity and then to the second cavity to be recirculated back to bore 364. In that situation where the pressure on fluid in the first cavity 368 is higher than the pressure on fluid in the bore 364, fluid will flow from the first cavity to the second cavity 382 to be pumped at higher pressure into the bore 364, as well as by entering the bore 364 directly by flowing through the fourth passage 408, sixth cavity 404, bore 460, and sixth fluid passage 413. When the pressure on the fluid in bore 364 and first cavity 368 is the same, fluid is discharged from the seventh passage 413 to the sixth cavity 404 and first cavity 368, and is then recirculated from the first cavity 368 to the second cavity 382 to be returned to bore 364 through the seventh passage 412.

As previously mentioned, an out-of-round brake drum 258 will cause the brake shoes 250 and 252 to reciprocate when in braking contact therewith, and this reciprocating movement is imparted to pistons 260 in bore 364. Pistons 260 then act as a pump and tend to force hydraulic fluid from the bore 364 back toward the master cylinder A, which is undesirable. This forcing of fluid from the brake cylinder F toward master cylinder A may be eliminated by providing an extension 470 of body 362 in which an eighth fluid passage 471 is formed that communicates with bore 364 and a tapped bore 472. A cylinder 474 is provided that has a closed end 476 from which a threaded boss 478 extends. Boss 478 engages tapped bore 472.

A piston 480 is slidably mounted in cylinder 474. A plug 482 removably closes the open end of the cylinder 474. A stiff helical spring 484 is mounted in cylinder 474 with one end thereof abutting against the plug 482 and the other end contacting piston 480. Fluid in bore 364 that would normally be pumped back toward master cylinder A by reciprocation of pistons 260, is instead pumped through the eighth passage 471 to reciprocate the spring-loaded piston 480 in cylinder 474.

Skidding of one of the wheels S can be caused by excessive build-up of pressure on fluid in bore 364 which can occur either by actuation of plunger 426 or as the fluid discharges from conduit G, as shown in FIGURE 1. When the excessive build-up in pressure occurs due to actuation of plunger 426, and no further flow of fluid takes place through the second, third and sixth passageways to bore 364, the fluid under excessive pressure in bore 364 flows therefrom through seventh passageway 413 to first cavity 368 by a path previously described in detail. This fluid under excessive pressure in first cavity 368 first flows to the left therefrom through first passageway 380 to fill the same as well as second cavity 382. Fluid under excessive pressure will also flow to the right through conduit G until the pressure in bore 368 is reduced to the extent that wheel S can again rotate while being braked. When fluid at a sufficiently high pressure flows into the mechanism Y (FIGURE 13) through conduit G and then to bore 368 to cause skidding of wheel S, such skidding can be minimized by providing a spring 484 of such resiliency that it will allow piston 480 to move downwardly sufficiently that the pressure on pistons 260 in bore 368 is decreased.

Although not illustrated, it will be apparent that the hydraulic brake system above described can be used on disc-type brakes.

Although the invention herein shown and described is fully capable of achieving the objects and providing the advantages hereinbefore mentioned, it is to be understood that it is merely illustrative of the presently preferred embodiment thereof, and that I do not mean to be limited to the details of construction herein shown and described other than as defined in the appended claims.

I claim:

1. A manually operable hydraulic fluid master cylinder, comprising: a piston; a body having a first bore defined therein in which said piston is slidably mounted, a cylindrical enclosed space formed in said body forwardly of said bore and connected thereto, two fluid passages connecting the forward and rearward ends of said first bore, a fluid outlet in said body communicating with said enclosed space, and a hydraulic fluid reservoir connected by at least one port to said first bore, with said piston dividing said first bore into a first forwardly disposed confined space and a second rearwardly disposed confined space; manually operable means for moving said piston forwardly in said first bore; means for closing the rearward end of said first bore; a valve stem mounted on the forward face of said piston and projecting forwardly therefrom; a resilient valve washer slidably movable in said enclosed space, said washer being capable of sealing engagement with said valve stem; spring means in said enclosed space that at all times tends to maintain said washer in sealing contact with a flat surface on that portion of said body forming the rear of said enclosed space; throttling valve means actuated by the forward movement of said piston for restricting the rate of fluid flow from said first confined space to said second confined space after said stem has slidably and sealingly engaged said washer, with the degree of said restriction increasing in proportion to the increased rate at which said piston is moved forwardly; first, second and third normally closed check valves, said first check valve opening only upon forward movement of said piston to permit hydraulic fluid to flow from said reservoir through said port to fill said second confined space, said second check valve opening only upon rearward movement of said piston to permit fluid to flow from said second to said first confined space, and said third check valve opening only upon rearward movement of said piston to permit fluid under pressure in said first confined space to flow through said port to said reservoir; and spring means that at all times tend to return said piston to a rearward position in said first bore, which piston when moved forwardly in said first bore by said manually operable means subjects fluid forwardly thereof to a first pressure until said valve stem seals with said valve washer, whereupon fluid from said first confined space flows through said throttling valve means to said second confined space to increase the force exerted by said piston and increase the pressure on fluid situated in said first confined space, said valve washer after sealing engagement with said stem moving forwardly slightly thereon due to said increased pressure on said fluid in said confined space to allow flow of fluid under said increased pressure into said enclosed space, but with said valve washer moving rearwardly so long as engaged by said valve stem to seal with said flat surface to prevent rearward flow of said fluid at higher pressure from said enclosed space to said first confined space, with said throttling valve means serving to regulate the rate at which pressure on said fluid in said first confined space can increase above said first pressure.

2. A master cylinder as defined in claim 1 wherein said piston is of lesser transverse cross section than that of said first bore, and in addition said piston is provided with flanges that project outwardly from the ends thereof to slidably engage said first bore, said flanges having fluid passages extending therethrough, with said first check valve being a resilient ring that abuts against the rear face of said rearward flange together with a compressed spring disposed in said second confined space that at all times tends to hold said ring in pressure fluid-sealing contact with said rear face of said rearward flange.

3. A master cylinder as defined in claim 1 wherein said piston is of lesser transverse cross section than that of said first bore, and in addition said piston has flanges projecting outwardly from the ends thereof which slidably engage said first bore, said flanges having fluid passages extending therethrough, with said third check valve being a resilient ring that abuts against the forward face of said forward flange together with spring means that at all times tend to hold said ring in pressure fluid-sealing contact with the forward face of said forward flange.

4. A master cylinder as defined in claim 1 wherein said second check valve is a resilient member that abuts against the forward face of said piston to obstruct one end of a fluid passage extending through said piston to said second confined space, and spring means is provided that at all times tends to hold said member in pressure fluid-sealing contact with said forward face of said piston to obstruct said fluid passage.

5. A hydraulic fluid master cylinder as defined in claim 1 wherein said throttling valve means includes a tubular body, a valve stem slidably movable in said body, which stem and valve body cooperatively define an orifice of variable cross section that communicates with said two fluid passages connecting said first and second confined spaces; a plate extending outwardly from said valve stem adapted to have a force exerted thereon by the pressure of fluid in said first confined space prior to flowing through said orifice, which force is exerted on said plate in a direction that tends to move said valve stem in a direction to increase the cross section of said orifice, and deformed spring means that tend to resist movement of said stem in a direction to increase the cross section of said orifice, but which spring means as the pressure on said fluid in said first confined space increases further deforms to allow movement of said valve stem in a direction to increase the cross section of said orifice.

6. A hydraulic fluid master cylinder as defined in claim 5 wherein said spring means comprise a plurality of spring washers that slidably encircle said valve stem.

References Cited in the file of this patent

UNITED STATES PATENTS

| | | |
|---|---|---|
| 564,863 | Beemer | July 28, 1896 |
| 740,513 | Bardsley et al. | Oct. 6, 1903 |
| 2,111,310 | Carroll | Mar. 15, 1938 |
| 2,569,670 | Hollerith | Oct. 2, 1951 |
| 2,694,902 | Baldwin | Nov. 23, 1954 |
| 2,924,945 | Oswalt | Feb. 16, 1960 |
| 2,926,499 | Oswalt | Mar. 1, 1960 |
| 2,972,867 | Klingler | Feb. 28, 1961 |